(No Model.)
N. WASHBURN.
CAR WHEEL.
No. 327,041. Patented Sept. 29, 1885.
Fig. 2.
Fig. 1.
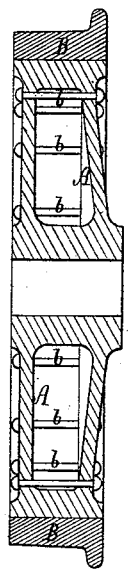
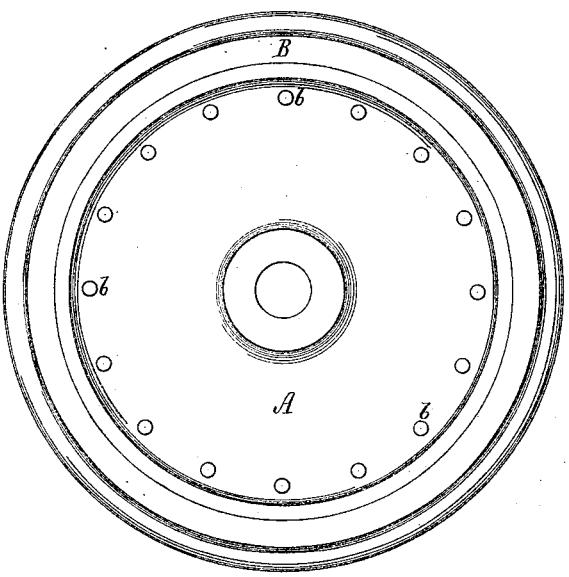
Witnesses.
S. N. Piper
L. N. Miller
Inventor,
Nathan Washburn.
by R. H. Eddy atty

UNITED STATES PATENT OFFICE.

NATHAN WASHBURN, OF BOSTON, MASSACHUSETTS.

CAR-WHEEL.

SPECIFICATION forming part of Letters Patent No. 327,041, dated September 29, 1885.

Application filed August 17, 1885. (No model.)

*To all whom it may concern:*

Be it known that I, NATHAN WASHBURN, of Boston, (Allston,) in the county of Suffolk, of the Commonwealth of Massachusetts, have invented a new and useful Improvement in Railway-Car Wheels; and I do hereby declare the same to be described in the following specification, and represented in the accompanying drawings, of which—

Figure 1 is a side elevation, and Fig. 2 a transverse section, of a car-wheel provided with my invention, the nature of which is defined in the claim hereinafter presented.

The body A of such wheel is of cast-iron, in shape in transverse section essentially as represented, the tire B being of steel, encompassing and welded to the rim of such body. Through such body, laterally of it, and close to the rim, is a series of re-enforces or iron rivets, $b$, which are arranged at equal distances apart, they being to prevent the rim from cracking or splitting in case of wear of the tire while the wheel may be in use.

I am aware that it is not new to make a cast-iron wheel with a tire held to the rim by two wrought-iron rings having the tire dovetailed into them and secured to the body by a series of bolts going through it and such rings. In my present wheel such rings are entirely dispensed with, and the wheel therefore rendered simpler and less costly in construction.

I claim as a new or improved manufacture—

A railway-car wheel having a body of cast-iron, a tire of steel welded to such body, and the body re-enforced near the rim by a series of bolts or rivets going through such body only, all being substantially as set forth.

NATHAN WASHBURN.

Witnesses:
R. H. EDDY,
ERNEST B. PRATT.